US012572093B2

(12) United States Patent
Akiyama et al.

(10) Patent No.: US 12,572,093 B2
(45) Date of Patent: Mar. 10, 2026

(54) HEAT GENERATING MEMBER, FIXING DEVICE, AND IMAGE FORMING APPARATUS

(71) Applicant: FUJIFILM Business Innovation Corp., Tokyo (JP)

(72) Inventors: Shingo Akiyama, Kanagawa (JP); Shogo Kamiya, Kanagawa (JP); Kotaro Araki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 368 days.

(21) Appl. No.: 18/181,178

(22) Filed: Mar. 9, 2023

(65) Prior Publication Data

US 2024/0100857 A1 Mar. 28, 2024

(30) Foreign Application Priority Data

Sep. 27, 2022 (JP) ................................ 2022-154040

(51) Int. Cl.

*G03G 15/20* (2006.01)
*B41J 2/335* (2006.01)
*B41J 11/00* (2006.01)

(52) U.S. Cl.

CPC ............ *G03G 15/20* (2013.01); *B41J 2/3354* (2013.01); *B41J 11/0024* (2021.01); *B41J 11/00244* (2021.01); *G03G 15/2053* (2013.01)

(58) Field of Classification Search

CPC ............... G03G 15/20; G03G 15/2003; G03G 15/2014; G03G 15/2017; G03G 15/2021;

(Continued)

(56) References Cited

U.S. PATENT DOCUMENTS

| | | | | |
|---|---|---|---|---|
| 2004/0131813 | A1* | 7/2004 | Mori | G03G 15/2053 428/36.9 |
| 2017/0343929 | A1* | 11/2017 | Narahara | G03G 15/206 |
| 2021/0373468 | A1* | 12/2021 | Kawai | G03G 15/2039 |

FOREIGN PATENT DOCUMENTS

| | | | |
|---|---|---|---|
| JP | 10-288905 | A | 10/1998 |
| JP | 2000-194221 | A | 7/2000 |
| JP | 2000-214707 | A | 8/2000 |

* cited by examiner

*Primary Examiner* — Scott A Richmond
(74) *Attorney, Agent, or Firm* — Sughrue Mion, PLLC

(57) ABSTRACT

A heat generating member includes: a hollow cylindrical part that is rotatable about a rotation axis and extends in an axial direction; a first heat generating component provided on an inner surface of the cylindrical part and configured to generate heat when energized; a first connecting component provided on an inner side relative to the cylindrical part and electrically connected to the first heat generating component, the first connecting component being rotatable together with the cylindrical part; a second connecting component provided on a further inner side relative to the cylindrical part than the first connecting component and electrically connected to a power source, the second connecting component being rotatable relative to the cylindrical part; a rotary supporting component that electrically connects the first connecting component and the second connecting component to each other and supports the first connecting component while allowing the first connecting component to rotate relative to the second connecting component; and a second heat generating component provided on a further inner side relative to the cylindrical part than the second connecting component and extending through the cylindrical part in a longitudinal direction of the cylindrical part, the second heat generating component being configured to generate heat when energized, the second heat generating com- (Continued)

ponent having a heat generating area different from a heat generating area of the first heat generating component.

20 Claims, 3 Drawing Sheets

(58) Field of Classification Search
CPC .............. G03G 15/2053; B41J 11/0024; B41J 11/00244
See application file for complete search history.

HEAT GENERATING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-154040 filed Sep. 27, 2022.

BACKGROUND

(i) Technical Field

The present disclosure relates to a heat generating member, a fixing device, and an image forming apparatus.

(ii) Related Art

A known technique disclosed by Japanese Unexamined Patent Application Publication No. 2000-214707 ([0006] to [0015], FIGS. 1 to 5) relates to a fixing device included in an image forming apparatus and configured to fix an unfixed image on a surface of a medium by heating the image.

In Japanese Unexamined Patent Application Publication No. 2000-214707, a heat roller (1) is disclosed that has a core (2), on the inner surface of which an insulating layer (4) and a heat generating resistor (5) are stacked. According to Japanese Unexamined Patent Application Publication No. 2000-214707, conductive tape (6) is pasted to each of two end portions of the heat generating resistor (5), a power feeding cap (10) and a power-feeding-cap holder (11) are attached to the inner peripheral side of the conductive tape (6), and a power-feeding-brush holder (20) is inserted into the power feeding cap (10) in the axial direction on the inside of the core (2), so that power is to be fed to the heat generating resistor (5).

SUMMARY

Aspects of non-limiting embodiments of the present disclosure relate to making the size of a structure of feeding power to a heat generating component smaller than in a case where power is fed to the heat generating component from the outer side in the axial direction or the radial direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heat generating member including: a hollow cylindrical part that is rotatable about a rotation axis and extends in an axial direction; a first heat generating component provided on an inner surface of the cylindrical part and configured to generate heat when energized; a first connecting component provided on an inner side relative to the cylindrical part and electrically connected to the first heat generating component, the first connecting component being rotatable together with the cylindrical part; a second connecting component provided on a further inner side relative to the cylindrical part than the first connecting component and electrically connected to a power source, the second connecting component being rotatable relative to the cylindrical part; a rotary supporting component that electrically connects the first connecting component and the second connecting component to each other and supports the first connecting component while allowing the first connecting component to rotate relative to the second connecting component; and a second heat generating component provided on a further inner side relative to the cylindrical part than the second connecting component and extending through the cylindrical part in a longitudinal direction of the cylindrical part, the second heat generating component being configured to generate heat when energized, the second heat generating component having a heat generating area different from a heat generating area of the first heat generating component.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will now be described with reference to the accompanying drawings. Note that the present disclosure is not limited to the following exemplary embodiment.

Figure 1:
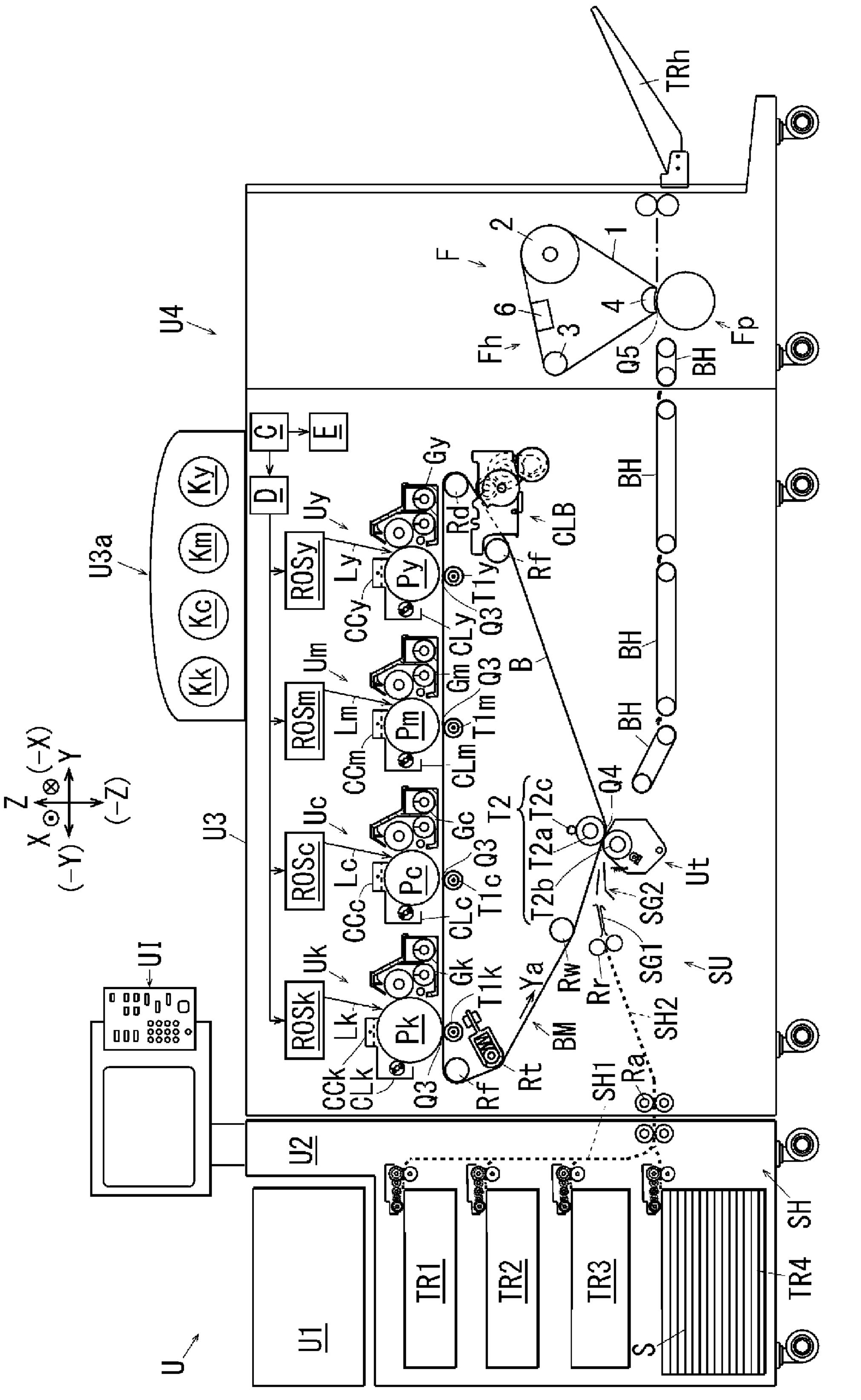
FIG. 1 illustrates the entirety of an image forming apparatus according to an exemplary embodiment of the present disclosure.

To help understand the following description, FIG. 1 is provided with an X axis representing the front-rear direction, a Y axis representing the horizontal direction, a Z axis representing the vertical direction, and arrows X, −X, Y, −Y, Z, and −Z representing the frontward, rearward, rightward, leftward, upward, and downward directions or the front, rear, right, left, upper, and lower sides, respectively.

Furthermore, in FIG. 1, a circle with a dot is regarded as an arrow representing a direction from the back of the page toward the front of the page, and a circle with a cross is regarded as an arrow representing a direction from the front of the page toward the back of the page.

To help understand the following description, irrelevant elements are not illustrated in the drawings.

Exemplary Embodiment

FIG. 1 illustrates the entirety of an image forming apparatus according to an exemplary embodiment of the present disclosure.

Referring to FIG. 1, a copying machine U is an exemplary image forming apparatus and includes an operation unit UI; a scanner device U1, which is an exemplary image reading device; a sheet feeding device U2; a printer unit U3, which is an exemplary image recording component; and a sheet output unit U4.

The operation unit UI includes input parts, for example, a power button and various keys such as a copy start key, a copy-number-setting key, and a numerical keypad; and other parts such as a display part.

The scanner device U1 reads a document (not illustrated), converts an image of the document into image information, and inputs the image information to the printer unit U3.

The sheet feeding device U2 includes a plurality of sheet feeding trays TR1, TR2, TR3, and TR4, which are exemplary sheet feeding units. The sheet feeding trays TR1 to TR4 each contain recording sheets S, which are each an exemplary medium. A sheet feeding path SH1 is an exemplary transport path for the medium and extends from the sheet feeding trays TR1 to TR4 to the printer unit U3.

The printer unit U3 illustrated in FIG. 1 includes a controller C and a power circuit E, which is controlled by the controller C and supplies power to relevant elements of the printer unit U3. The controller C receives the image information representing the document that is read by the scanner device U1, or image information that is transmitted from a personal computer serving as an exemplary information transmitting device (not illustrated) connected to the copying machine U.

The controller C processes the received image information into pieces of printing information for yellow Y, magenta M, cyan C, and black K and outputs the pieces of printing information to a laser driving circuit D, which is an exemplary driving circuit for a latent-image-drawing device. The laser driving circuit D receives a laser driving signal from the controller C and outputs with a predetermined timing the laser driving signal to exposure devices ROSy, ROSm, ROSc, and ROSk, which are exemplary latent-image-forming components for the respective colors.

Image carrier units Uy, Um, Uc, and Uk for the respective colors of Y, M, C, and K are provided below the respective exposure devices ROSy, ROSm, ROSc, and ROSk.

Referring to FIG. 1, the image carrier unit Uk for black K includes a photoconductor drum Pk, which is an exemplary image carrying component; a charging corotron CCk, which is an exemplary charging component; and a photoconductor cleaner CLk, which is an exemplary cleaning component for the image carrying component. The image carrier units Uy, Um, and Uc for the other colors of Y, M, and C also include respective photoconductor drums Py, Pm, and Pc; respective charging corotrons CCy, CCm, and CCc; and respective photoconductor cleaners CLy, CLm, and CLc.

In the present exemplary embodiment, the photoconductor drum Pk for the color K, which tends to be used frequently and therefore wears fast, has a larger diameter than the photoconductor drums Py, Pm, and Pc for the other colors. Correspondingly, the photoconductor drum Pk is rotatable faster and is given a longer life than the others.

The photoconductor drums Py, Pm, Pc, and Pk are uniformly charged by the respective charging corotrons CCy, CCm, CCc, and CCk and are then irradiated with respective laser beams Ly, Lm, Lc, and Lk, which are exemplary latent-image-drawing rays, emitted from the respective exposure devices ROSy, ROSm, ROSc, and ROSk, whereby electrostatic latent images are formed on the respective photoconductor drums Py, Pm, Pc, and Pk. The electrostatic latent images thus formed on the photoconductor drums Py, Pm, Pc, and Pk are developed into toner images in the respective colors of yellow Y, magenta M, cyan C, and black K by respective developing devices Gy, Gm, Gc, and Gk, which are exemplary developing components.

The toner images on the photoconductor drums Py, Pm, Pc, and Pk are sequentially transferred to an intermediate transfer belt B, which is an exemplary intermediate transfer component and an exemplary image carrying component, in respective first transfer areas Q3 by respective first transfer rolls T1*y*, T1*m*, T1*c*, and T1*k*, which are exemplary first transfer components, whereby the toner images are superposed one on top of another and form a multicolor image, or a so-called color image, on the intermediate transfer belt B. The color image thus formed on the intermediate transfer belt B is transported to a second transfer area Q4.

If the image information contains black image data alone, only the photoconductor drum Pk and the developing device Gk for black K are used, whereby only a black toner image is formed.

After the above first transfer process, residual toner particles on the photoconductor drums Py, Pm, Pc, and Pk are removed by the respective photoconductor cleaners CLy, CLm, CLc, and CLk.

Combinations of the image carrier units Uy, Um, Uc, and Uk and the respective developing devices Gy, Gm, Gc, and Gk are regarded as toner-image-forming members Uy+Gy, Um+Gm, Uc+Gc, and Uk+Gk and serve as exemplary image forming components.

The printer unit U3 is provided at the top thereof with a toner dispenser U3*a*, which is an exemplary refilling component. Toner cartridges Ky, Km, Kc, and Kk are exemplary developer containing components and are detachably attached to the toner dispenser U3*a*. When toners in the respective developing devices Gy, Gm, Gc, and Gk are consumed with an image forming operation, fresh toners in the respective toner cartridges Ky, Km, Kc, and Kk are supplied to the respective developing devices Gy, Gm, Gc, and Gk.

The intermediate transfer belt B is provided below the photoconductor drums Py, Pm, Pc, and Pk and is stretched around the following: an intermediate driving roll Rd, which is an exemplary driving component for the intermediate transfer component; an intermediate tension roll Rt, which is an exemplary tension applying component that applies a tension to the intermediate transfer belt B; an intermediate steering roll Rw, which is an exemplary first skew correcting component that corrects any skew or meandering of the intermediate transfer belt B; a plurality of intermediate idler rolls Rf, which are exemplary follower components; and a backup roll T2*a*, which is an exemplary counter component provided in the second transfer area Q4. The intermediate transfer belt B thus supported is rotatable in a direction of arrow Ya with the activation of the intermediate driving roll Rd.

A combination of the intermediate driving roll Rd, the intermediate tension roll Rt, the intermediate steering roll Rw, the intermediate idler rolls Rf, the backup roll T2*a*, the first transfer rolls T1*y*, T1*m*, T1*c*, and T1*k*, the intermediate transfer belt B, and other relevant elements is regarded as a belt module BM, which is an exemplary intermediate transfer device. The belt module BM according to the present exemplary embodiment is an exchangeable unit that is detachable from the printer unit U3.

A second transfer unit Ut is an exemplary transfer-transporting component and is provided below the backup roll T2*a*. The second transfer unit Ut includes a second transfer roll T2*b*, which is an exemplary transfer member. The second transfer roll T2*b* is positioned across from the backup roll T2*a*. The area where the second transfer roll T2*b* faces the intermediate transfer belt B is regarded as the second transfer area Q4. The backup roll T2*a* is provided with a contact roll T2*c*, which is an exemplary contact component for voltage application and is in contact with the backup roll T2*a*. The contact roll T2*c* receives a second transfer voltage, which is applied with a preset timing from the power circuit E controlled by the controller C and has the same polarity as for toner charging.

A combination of the rolls T2*a* to T2*c* is regarded as a second transfer device T2, which is as an exemplary second transfer component. A combination of the intermediate transfer belt B, the first transfer rolls T1*y*, T1*m*, T1*c*, and T1*k*, the second transfer device T2, and other relevant elements is regarded as a transfer device B+T1+T2, which is an exemplary transfer component.

A sheet transport path SH2 runs below the belt module BM. A recording sheet S fed from the sheet feeding path SH1 in the sheet feeding device U2 is transported to the sheet transport path SH2 by transporting rolls Ra, which are exemplary transporting components. The recording sheet S in the sheet transport path SH2 is forwarded by a registration roll Rr, which is an exemplary forwarding component, synchronously with the timing of the toner image's reaching the second transfer area Q4 and is then guided to the second transfer area Q4 by sheet guides SG1 and SG2, which are exemplary medium guiding components.

Any toner image on the intermediate transfer belt B is transferred to the recording sheet S by the second transfer device T2 when passing through the second transfer area Q4. In the case of a color image, toner images superposed one on top of another on the intermediate transfer belt B in the first transfer process are transferred to the recording sheet S at a time in a second transfer process.

The intermediate transfer belt B having undergone the second transfer process is cleaned by a belt cleaner CLB, which is an exemplary cleaning component for the intermediate transfer component.

The recording sheet S having received the toner image in the second transfer process is transported to medium transporting belts BH, which are exemplary transporting components. The medium transporting belts BH transport the recording sheet S to a fixing device F. The fixing device F is an exemplary fixing component and includes a heating unit Fh, which is an exemplary heating component; and a pressing roll Fp, which is an exemplary pressing component. The heating unit Fh and the pressing roll Fp are positioned face to face with each other and in contact with each other in an area serving as a fixing area Q5.

The toner image on the recording sheet S is thermally fixed by the fixing device F when passing through the fixing area Q5. The recording sheet S having the toner image thus fixed by the fixing device F is outputted to an output tray TRh, which is an exemplary output part.

A combination of the sheet feeding path SH1, the sheet transport path SH2, and other relevant paths is regarded as a sheet transport path SH. A combination of the sheet transport path SH, the transporting rolls Ra, the registration roll Rr, the sheet guides SG1 and SG2, the medium transporting belts BH, and other relevant elements is regarded as a sheet transporting device SU.

Description of Fixing Device

Referring to FIG. 1, the heating unit Fh of the fixing device F according to the present exemplary embodiment includes a fixing belt 1, which is an exemplary belt component; a heating roll 2, which is an exemplary heat generating member; a steering roll 3, which is an exemplary skew correcting component; and a heating pad 4, which is an exemplary counter component. The fixing belt 1 is stretched around the heating roll 2, the steering roll 3, and the heating pad 4. The fixing belt 1 is provided on the inner peripheral surface thereof with a wick 6, which is an exemplary lubricating component and is configured to apply a lubricant to the fixing belt 1.

The heating roll 2 is configured to heat the fixing belt 1. The steering roll 3 is configured to correct any meandering or skew of the fixing belt 1. The heating pad 4 is positioned against the pressing roll Fp. Any unfixed image on the recording sheet S that passes through the fixing area Q5 defined between the fixing belt 1 supported by the heating pad 4 and the pressing roll Fp is pressed between the two while being heated and is thus fixed to the recording sheet S.

Figure 2:
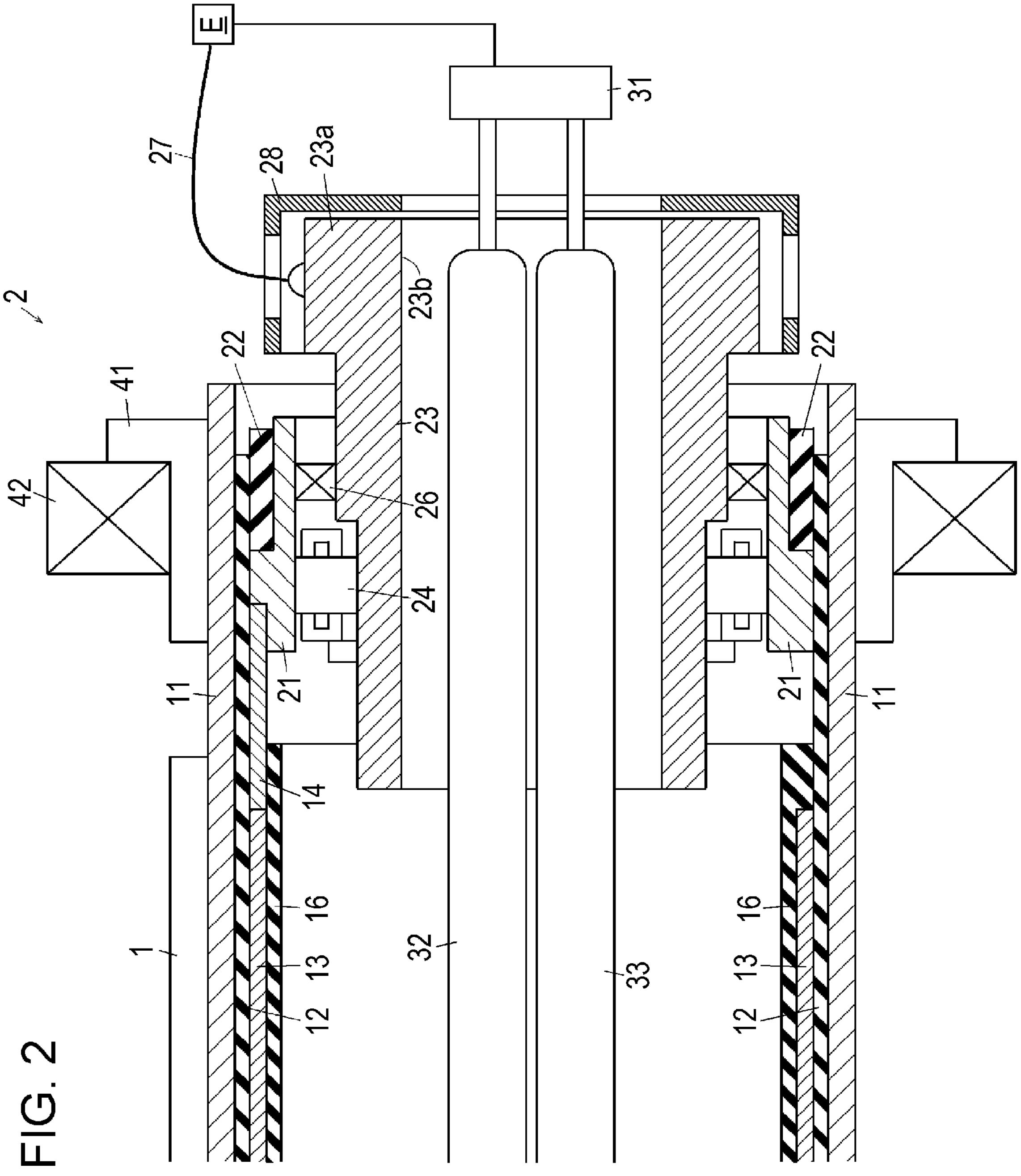
FIG. 2 illustrates an end portion of a fixing device according to the exemplary embodiment.

FIG. 2 illustrates an end portion of the fixing device F according to the present exemplary embodiment.

Figure 3:
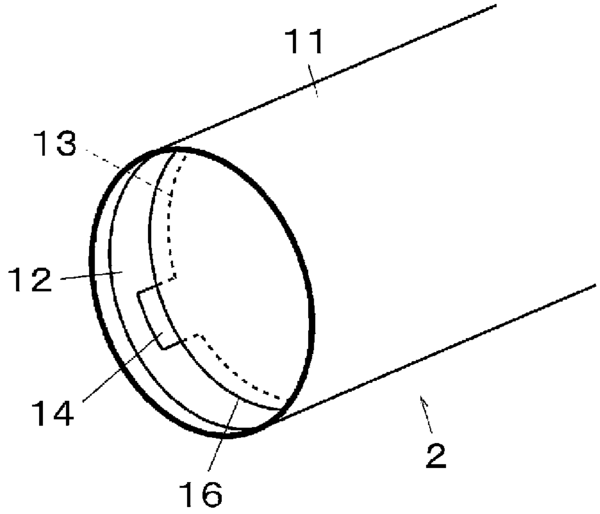
FIG. 3 illustrates relevant elements at an end portion of a heating roll.

FIG. 3 illustrates relevant elements at an end portion of the heating roll 2.

Referring to FIG. 2, the heating roll 2 includes a core 11, which is an exemplary cylindrical part. On the inner peripheral surface of the core 11 is provided a first insulating layer 12, which is an exemplary first insulating component. The length of the first insulating layer 12 in the axial direction of the core 11 is smaller than the length of the core 11.

On the inner peripheral surface of the first insulating layer 12 is provided a resistance heating element 13, which is an exemplary first heat generating component. The axial length of the resistance heating element 13 is smaller than the axial length of the first insulating layer 12. Referring to FIG. 3, a part of an end portion of the resistance heating element 13 forms a contact part 14, which is an exemplary contact component and projects outward in the axial direction while extending in the peripheral direction.

On the inner peripheral surface of the resistance heating element 13 is provided a second insulating layer 16, which is an exemplary second insulating component. The axial length of the second insulating layer 16 is greater than the axial length of the resistance heating element 13, with the axially outer end of the second insulating layer 16 being located on the axially inner side relative to the axially outer end of the contact part 14.

Referring to FIG. 2, at a position inside the core 11 is supported a rotary electrode 21, which is an exemplary first connecting component and is in contact with the contact part 14. Both the axially inner end and the axially outer end of the rotary electrode 21 are located on the axially inner side relative to the axially outer end of the core 11. The rotary electrode 21 is made of an electrically conductive material. The rotary electrode 21 is supported in such a manner as to be rotatable together with the core 11, the resistance heating element 13, and so forth.

Between the rotary electrode 21 and the core 11 is supported an insulating cap 22, which is an exemplary third insulating component.

On the inner peripheral side relative to the rotary electrode 21 is supported a fixed electrode 23, which is an exemplary second connecting component. The fixed electrode 23 is made of an electrically conductive material.

Between the rotary electrode 21 and the fixed electrode 23 is provided an energizing runner 24, which is an exemplary rotary supporting component. The energizing runner 24 supports the rotary electrode 21 while allowing the rotary electrode 21 to rotate relative to the fixed electrode 23. The energizing runner 24 according to the present exemplary embodiment is a rotatable runner. The energizing runner 24 electrically connects the rotary electrode 21 and the fixed electrode 23 to each other.

On the outer side relative to the energizing runner 24 in the axial direction of the core 11 is provided an assist bearing 26, which is an exemplary bearing component. The assist bearing 26 is intended to stabilize the rotation of the core 11 and so forth but may be omitted if the core 11 is stably rotatable only with the energizing runner 24. The assist bearing 26 according to the present exemplary embodiment is made of an electrically nonconductive material but may be made of an electrically conductive material. If the assist bearing 26 is made of an electrically conductive material, a combination of the assist bearing 26 and the energizing runner 24 serves as the rotary supporting component that is responsible for electrical connection.

The fixed electrode 23 includes an axially outer end portion 23*a*, which is located on the outer side relative to the outer end of the core 11 in the axial direction. The fixed electrode 23 has at the radial center thereof a through-hole 23*b*, which extends through the fixed electrode 23 in the axial direction.

The outer end portion 23*a* of the fixed electrode 23 is provided with a power feeding harness 27, which is an exemplary power feeding component. Accordingly, the power feeding harness 27 is connected to the fixed electrode 23 at a position on the radially inner side relative to the core 11. The power feeding harness 27 is connected to the power circuit E, which is provided outside the heating roll 2, whereby power is feedable to the heating roll 2.

Around the outer end portion 23*a* of the fixed electrode 23 is provided a covering 28, which is an exemplary covering component.

Figure 4:
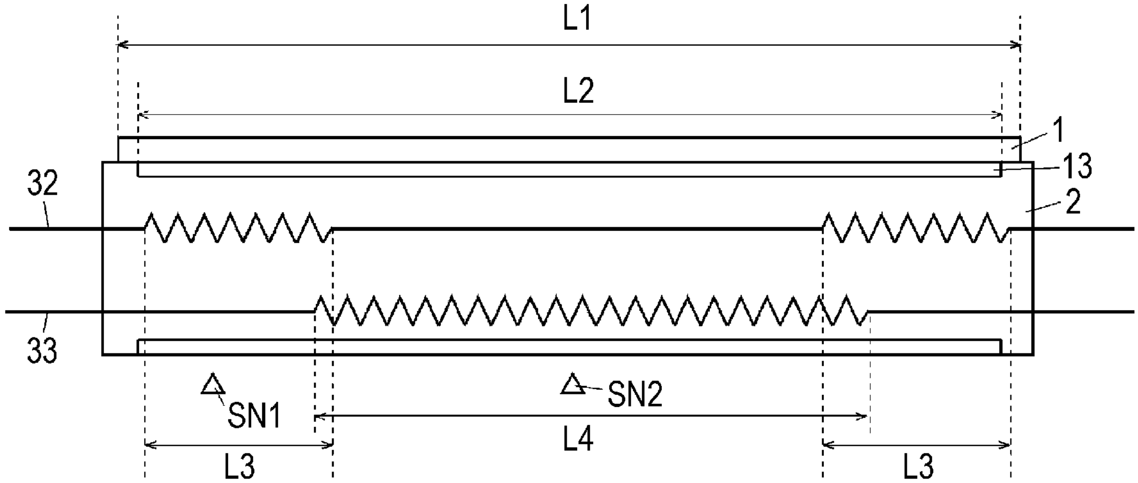
FIG. 4 illustrates heat generating areas of a first heat generating component, a second heat generating component, and a third heat generating component according to the exemplary embodiment.

FIG. 4 illustrates heat generating areas of the first heat generating component, a second heat generating component, and a third heat generating component according to the present exemplary embodiment.

In the through-hole 23*b* of the fixed electrode 23 is positioned a lamp unit 31, which is an exemplary heat generating unit. The lamp unit 31 extends through the core 11 in the axial direction (longitudinal direction). The lamp unit 31 according to the present exemplary embodiment includes an outer heating lamp 32, which is an exemplary second heat generating component; and an inner heating lamp 33, which is an exemplary third heat generating component. The outer heating lamp 32 and the inner heating lamp 33 each extend in the axial direction and are arranged parallel to each other.

In the heating roll 2 according to the present exemplary embodiment, as illustrated in FIG. 4, the fixing belt 1 has a width L1, and the resistance heating element 13 is configured to heat an area of the fixing belt 1 that has a resistance heating width L2, the area covering substantially the entirety of the fixing belt 1 in the axial direction of the core 11, i.e., in the width direction of the recording sheet S. The outer heating lamp 32 is configured to heat areas each having a first heating width L3 and located at two respective end portions of the area defined by the resistance heating width L2. The inner heating lamp 33 is configured to heat an area having a second heating width L4 and located in a central part of the area defined by the resistance heating width L2. Specifically, in the present exemplary embodiment, the areas each defined by the first heating width L3 and to be heated by the outer heating lamp 32 are different from (do not entirely coincide with) but each overlap in part with the area defined by the resistance heating width L2 in the axial direction. Furthermore, the areas defined by the first heating width L3 and the area defined by the second heating width L4 are different from each other but overlap in part with each other, and the area defined by the second heating width L4 and the area defined by the resistance heating width L2 are different from each other but overlap in part with each other.

In the present exemplary embodiment, the outer heating lamp 32 and the inner heating lamp 33 are controlled to be turned on or off with reference to the temperatures detected by an outer temperature sensor SN1 and an inner temperature sensor SN2. The outer heating lamp 32 is turned on if the temperature detected by the outer temperature sensor SN1 is below the lower limit of a predetermined controlled temperature range, and is turned off if the temperature detected by the outer temperature sensor SN1 exceeds the upper limit of the controlled temperature range. As with the case of the outer heating lamp 32, the inner heating lamp 33 is controlled to be turned on or off with reference to the temperature detected by the inner temperature sensor SN2. In the present exemplary embodiment, the resistance heating element 13 is controlled to be turned on or off with reference to the temperature detected by the inner temperature sensor SN2 but may alternatively be controlled with reference to the temperature detected by the outer temperature sensor SN1.

Referring to FIG. 2, the core 11 is provided on the outer surface thereof with a heat insulating collar 41, which is an exemplary heat insulating component. The heat insulating collar 41 is intended to reduce the amount of heat transmission from the resistance heating element 13 and the lamp unit 31, which are located on the axially inner side, toward the axially outer side. The heat insulating collar 41 is supported in such a manner as to be rotatable together with the core 11. In the present exemplary embodiment, the position of the heat insulating collar 41 coincides with the position of the energizing runner 24 in the axial direction and is set on the outer side relative to the energizing runner 24 in the radial direction. That is, the core 11 is supported by being held between the energizing runner 24 and the heat insulating collar 41 in the radial direction.

The heat insulating collar 41 is supported by a bearing 42, which is an exemplary bearing component. The bearing 42 is supported by a frame (not illustrated) of the heating unit Fh. Thus, the heat insulating collar 41, the core 11, and other relevant elements are supported by the bearing 42 in such a manner as to be rotatable relative to the frame.

Functions of Exemplary Embodiment

In the copying machine U according to the present exemplary embodiment employing the above configuration, when an image forming operation is started, an image is transferred to a recording sheet S in the second transfer area Q4, and the image is fixed in the fixing area Q5 of the fixing device F. In the heating unit Fh according to the present exemplary embodiment, the resistance heating element 13 is energized and generates heat for the fixing process, whereby the fixing belt 1 is heated. When the fixing belt 1 passes through the fixing area Q5, the developer on the surface of the recording sheet S is heated, is melted, and is thus fixed. If recording sheets S each having a smaller width than the fixing belt 1 are to be used, the temperature in an area where such a recording sheet S passes is lowered every time the recording sheet S passes, whereas the temperature in the other areas where the recording sheet S does not pass is not lowered. Accordingly, the temperature of the fixing belt 1 may become nonuniform in the axial direction. Such temperature nonuniformity tends to become more pronounced as the number of printed pages per unit time increases.

If the heating roll includes only the resistance heating element as in the configuration disclosed by Japanese Unexamined Patent Application Publication No. 2000-214707, it is difficult in terms of structural matter to generate heat only in a specific area in the axial direction. For example, if the fixing process is continued even after the temperature in a central area in the width direction (axial direction) is lowered, the fixing temperature may become insufficient, which may lead to defective fixing. However, if heat is generated to raise the lowered temperature in the central area to the predetermined fixing temperature, areas on both sides of the central area in the width direction are overheated, which may lead to thermal runaway of other elements or damage to other elements or, in the worst case, a fire. Therefore, in the configuration according to Japanese Unexamined Patent Application Publication No. 2000-214707, if the temperature is lowered to a point below a tolerable range, the image forming operation needs to be suspended for temperature recovery, which reduces productivity.

In view of the above, the present exemplary embodiment employs the two heating lamps 32 and 33, in addition to the resistance heating element 13. Therefore, if the temperature in some area in the width direction is lowered while the core 11 is being heated with the resistance heating element 13, either of the heating lamps 32 and 33 is turned on, whereby the predetermined temperature is recovered.

In the configuration according to Japanese Unexamined Patent Application Publication No. 2000-214707, the power-feeding-brush holder (20) is inserted into the power feeding cap (10) in the axial direction on the inside of the core (2), so that power is to be fed to the heat generating resistor (5). Therefore, it is not easy in terms of structural matter to introduce a lamp that extends through the core (2) in the axial direction at such a location. To introduce the above lamp, the configurations of the power feeding caps (10) and the power-feeding-brush holder (20) need to be changed drastically, which may increase the size of the entire structure.

In a typical heating roll including a lamp provided inside the core thereof, a resistance heating element, if added, tends to be provided on the outer peripheral surface of the core. If a resistance heating element is provided on the outer peripheral surface of the core, the power feeding harness to be connected to the resistance heating element is to be provided on the further outer side relative to the resistance heating element. Accordingly, the size of the heating roll as a whole increases in the radial direction. Moreover, unless the power feeding harness is provided on the outer side relative to the heat insulating collar, the power feeding harness tends to be deteriorated or damaged by the heat. However, if the electrodes and the power feeding harness are provided on the outer side relative to the heat insulating collar, the axial length of the heating roll as a whole increases.

In view of the above, the present exemplary embodiment employs the rotary electrode 21 and the fixed electrode 23 that are provided on the radially inner side relative to the core 11, and the energizing runner 24 is added for power feeding. In the present exemplary embodiment, the rotary electrode 21 and most part of the fixed electrode 23 are located on the inner side relative to the outer ends of the core 11, and the power feeding harness 27 is connected to the outer end portion 23*a* of the fixed electrode 23, which has smaller outside diameter than the core 11.

In particular, the rotary electrode 21 and the energizing runner 24 are entirely located inside the core 11. That is, in the present exemplary embodiment, what is located on the outer side relative to the axially outer end of the core 11 is the outer end portion 23*a* of the fixed electrode 23.

Furthermore, the rotary electrode 21 and the fixed electrode 23 are located on the inner side relative to the outer circumference of the core 11.

Furthermore, the present exemplary embodiment employs the outer heating lamp 32 and the inner heating lamp 33 that are capable of heating respectively different areas defined by the lengths L3 and LA.

Furthermore, in the present exemplary embodiment, the rotary electrode 21 and the fixed electrode 23 are energized through the energizing runner 24 that is rotatable, and are rotatably supported by the assist bearing 26.

Modifications

While an exemplary embodiment of the present disclosure has been described in detail above, the present disclosure is not limited to the above exemplary embodiment. Various changes may be made to the above exemplary embodiment within the scope of the present disclosure defined by the appended claims. Modifications (H01) to (H07) of the present disclosure are as follows.

(H01) While the above exemplary embodiment concerns the copying machine U serving as an exemplary image forming apparatus, the image forming apparatus is not limited thereto and may be, for example, a facsimile, a printer, or a multifunction machine.

(H02) While the above exemplary embodiment concerns an image forming apparatus to be used with developers having four respective colors, the image forming apparatus is not limited thereto and may be, for example, a monochrome image forming apparatus or any other multicolor image forming apparatus to be used with developers having three or less colors or five or more colors.

(H03) While the above exemplary embodiment concerns a case where the entirety of the rotary electrode 21 is located on the inside of the core 11 in the axial direction, an outer end portion of the rotary electrode 21 may be located on the outside of the core 11.

(H04) While the above exemplary embodiment concerns a configuration including the heating lamps 32 and 33 of two kinds, the configuration is not limited thereto. For example, a configuration including a single heating lamp may be employed if relevant conditions are satisfied with the inner heating lamp 33 alone. Alternatively, a configuration including lamps of three or more kinds may be employed.

(H05) The areas defined by the heating widths L2 to L4 in the above exemplary embodiment are not limited to the areas described above and may be changed in any way in accordance with relevant designs, specifications, or the like. For example, while the above exemplary embodiment concerns a case where the area having the first heating width L3 is defined at each of the two end portions in the axial direction, the area having the first heating width L3 may be defined only on one of the two end portions in the axial direction.

(H06) The layered structure according to the above exemplary embodiment including the resistance heating element 13 is not limited to the above and may include any additional layers.

(H07) While the above exemplary embodiment employs the contact part 14, the resistance heating element 13 may be directly in contact with the rotary electrode 21.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A heat generating member comprising:

a hollow cylindrical part that is rotatable about a rotation axis and extends in an axial direction;

a first heat generating component provided on an inner surface of the cylindrical part and configured to generate heat when energized;

a first connecting component provided on an inner side relative to the cylindrical part and electrically connected to the first heat generating component, the first connecting component being rotatable together with the cylindrical part;

a second connecting component provided on a further inner side relative to the cylindrical part than the first connecting component and electrically connected to a power source, the second connecting component being rotatable relative to the cylindrical part;

a rotary supporting component that electrically connects the first connecting component and the second connecting component to each other and supports the first connecting component while allowing the first connecting component to rotate relative to the second connecting component; and a second heat generating component provided on a further inner side relative to the cylindrical part than the second connecting component and extending through the cylindrical part in a longitudinal direction of the cylindrical part, the second heat generating component being configured to generate heat when energized, the second heat generating component having a heat generating area different from a heat generating area of the first heat generating component.

(((2)))

The heat generating member according to (((1))), wherein an axially inner end of the first connecting component is located on an axially inner side relative to an axially outer end of the cylindrical part.

(((3)))

The heat generating member according to (((1))) or (((2))), wherein the heat generating area of the second heat generating component is different from the heat generating area of the first heat generating component in the axial direction and overlap with the heat generating area of the first heat generating component in part in the axial direction.

(((4)))

The heat generating member according to any one of (((1))) to (((3))), further comprising:

a third heat generating component arranged parallel to the second heat generating component and configured to generate heat when energized.

(((5)))

The heat generating member according to (((4))), wherein the heat generating area of the second heat generating component and a heat generating area of the third heat generating component are different from each other in the axial direction.

(((6)))

The heat generating member according to any one of (((1))) to (((5))), further comprising:

a rotatable runner serving as the rotary supporting component; and a bearing component provided between the first connecting component and the second connecting component.

(((7)))

The heat generating member according to any one of (((1))) to (((6))), further comprising:

a power feeding component that connects the second connecting component and the power source to each other and that has an end portion connected to the second connecting component on a radially inner side relative to the cylindrical part.

(((8)))

A fixing device comprising:

a heating component including the heat generating member according to any one of (((1))) to (((7))) and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

(((9)))

An image forming apparatus comprising:

an image carrying component on a surface of which an image is to be carried;

a transfer component configured to transfer the image on the image carrying component to a medium; and the fixing device according to (((8))) that is configured to fix the image transferred to the medium.

What is claimed is:

1. A heat generating member comprising:

a hollow cylindrical part that is rotatable about a rotation axis and extends in an axial direction;

a first heat generating component provided on an inner surface of the cylindrical part and configured to generate heat when energized;

a first connecting component provided on an inner side relative to the cylindrical part and electrically connected to the first heat generating component, the first connecting component being rotatable together with the cylindrical part;

a second connecting component provided on a further inner side relative to the cylindrical part than the first connecting component and electrically connected to a power source, the second connecting component being rotatable relative to the cylindrical part;

a rotary supporting component that electrically connects the first connecting component and the second connecting component to each other and supports the first connecting component while allowing the first connecting component to rotate relative to the second connecting component; and a second heat generating component provided on a further inner side relative to the cylindrical part than the second connecting component and extending through the cylindrical part in a longitudinal direction of the cylindrical part, the second heat generating component being configured to generate heat when energized, the second heat generating component having a heat generating area different from a heat generating area of the first heat generating component.

2. The heat generating member according to claim 1, wherein an axially inner end of the first connecting component is located on an axially inner side relative to an axially outer end of the cylindrical part.

3. A fixing device comprising:

a heating component including the heat generating member according to claim 2 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

4. An image forming apparatus comprising:

an image carrying component on a surface of which an image is to be carried;

a transfer component configured to transfer the image on the image carrying component to a medium; and the fixing device according to claim 3 that is configured to fix the image transferred to the medium.

5. The heat generating member according to claim 1, wherein the heat generating area of the second heat generating component is different from the heat generating area of the first heat generating component in the axial direction and overlap with the heat generating area of the first heat generating component in part in the axial direction.

6. A fixing device comprising:

a heating component including the heat generating member according to claim 5 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

7. An image forming apparatus comprising:

an image carrying component on a surface of which an image is to be carried;

a transfer component configured to transfer the image on the image carrying component to a medium; and the fixing device according to claim 6 that is configured to fix the image transferred to the medium.

8. The heat generating member according to claim 1, further comprising:

a third heat generating component arranged parallel to the second heat generating component and configured to generate heat when energized.

9. The heat generating member according to claim 8, wherein the heat generating area of the second heat generating component and a heat generating area of the third heat generating component are different from each other in the axial direction.

10. A fixing device comprising:

a heating component including the heat generating member according to claim 5 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

11. An image forming apparatus comprising:

an image carrying component on a surface of which an image is to be carried;

a transfer component configured to transfer the image on the image carrying component to a medium; and the fixing device according to claim 10 that is configured to fix the image transferred to the medium.

12. A fixing device comprising:

a heating component including the heat generating member according to claim 4 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

13. An image forming apparatus comprising:

an image carrying component on a surface of which an image is to be carried;

a transfer component configured to transfer the image on the image carrying component to a medium; and the fixing device according to claim 12 that is configured to fix the image transferred to the medium.

14. The heat generating member according to claim 1, further comprising:

a rotatable runner serving as the rotary supporting component; and a bearing component provided between the first connecting component and the second connecting component.

15. A fixing device comprising:

a heating component including the heat generating member according to claim 14 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

16. An image forming apparatus comprising:

an image carrying component on a surface of which an image is to be carried;

a transfer component configured to transfer the image on the image carrying component to a medium; and the fixing device according to claim 15 that is configured to fix the image transferred to the medium.

17. The heat generating member according to claim 1, further comprising:

a power feeding component that connects the second connecting component and the power source to each other and that has an end portion connected to the second connecting component on a radially inner side relative to the cylindrical part.

18. A fixing device comprising:

a heating component including the heat generating member according to claim 17 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

19. A fixing device comprising:

a heating component including the heat generating member according to claim 1 and configured to heat a medium having an unfixed image on a surface; and a pressing component positioned against the heating component and configured to press the medium, wherein the unfixed image on the surface of the medium is to be fixed when the medium passes through a fixing area defined between the pressing component and the heating component.

20. An image forming apparatus comprising:

an image carrying component on a surface of which an image is to be carried;

a transfer component configured to transfer the image on the image carrying component to a medium; and the fixing device according to claim 19 that is configured to fix the image transferred to the medium.

* * * * *